(12) United States Patent
Marra et al.

(10) Patent No.: US 6,361,124 B1
(45) Date of Patent: Mar. 26, 2002

(54) METHOD OF BRAKING IN AN INTEGRATED TRAIN PROPULSION AND BRAKE SYSTEM

(75) Inventors: Jon M. Marra, Henderson, NY (US); Roger B. Lewis, Stem, NC (US); John LaDuc, Harrisville; Kevin B. Root, Black River, both of NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/698,287

(22) Filed: Oct. 30, 2000

Related U.S. Application Data

(63) Continuation-in-part of application No. 09/397,676, filed on Sep. 16, 1999, which is a continuation-in-part of application No. PCT/US98/23766, filed on Nov. 10, 1998.
(60) Provisional application No. 60/065,064, filed on Nov. 10, 1997.

(51) Int. Cl.$^7$ .............................. B60T 7/00; B60T 13/70
(52) U.S. Cl. ............................................. 303/15; 303/7
(58) Field of Search ................................. 303/3, 15, 70, 303/7

(56) References Cited

U.S. PATENT DOCUMENTS

| | | | |
|---|---|---|---|
| 4,652,057 A | 3/1987 | Engle et al. | |
| 5,538,331 A | 7/1996 | Kettle, Jr. | |
| 5,590,042 A | 12/1996 | Allen, Jr. et al. | |
| 5,862,048 A | 1/1999 | Knight | |
| 5,984,427 A | 11/1999 | Kettle, Jr. | |

*Primary Examiner*—Christopher P. Schwartz
*Assistant Examiner*—Robert A. Siconolfi
(74) *Attorney, Agent, or Firm*—Barnes & Thornburg

(57) ABSTRACT

A method of integral operating the brake and propulsion systems includes determining if the brake command signal is a pneumatic or electrical system initiated emergency brake command or an operator initiated emergency brake command. A brake signal and an emergency propulsion signal are transmitted on the network for pneumatic and electrical system and operator initiated brake commands. A brake signal is transmitted on the train brake pipe for operator and pneumatic system initiated brake commands.

30 Claims, 7 Drawing Sheets

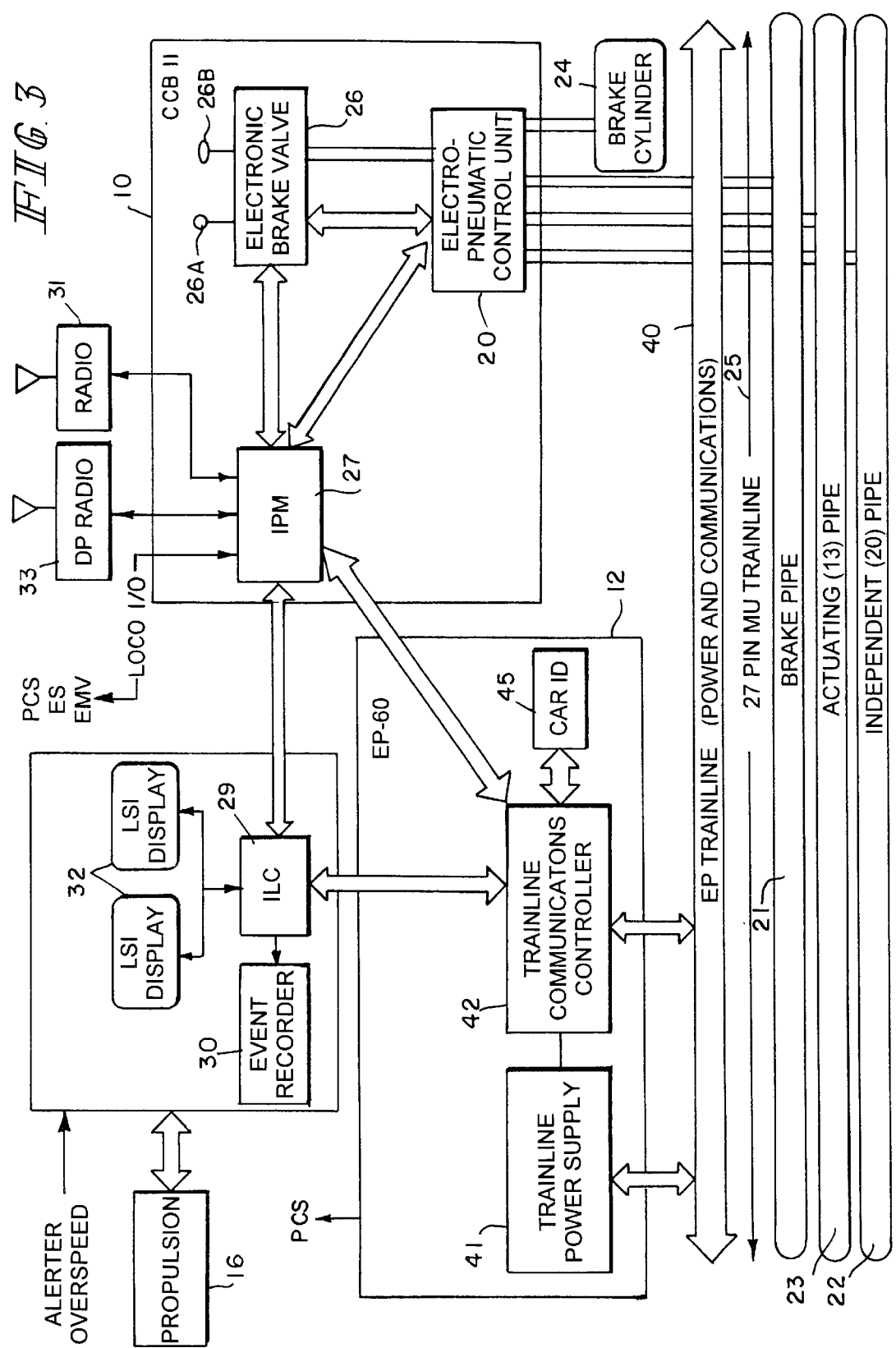

METHOD OF BRAKING IN AN INTEGRATED TRAIN PROPULSION AND BRAKE SYSTEM

CROSS-REFERENCE

This application is a continuation-in-part of U.S. application Ser. No. 09/397,676 filed Sep. 16, 1999 which is a continuation-in-part of PCT application US98/23766 filed Nov. 10, 1998 which claims priority of U.S. Provisional Application No. 60/065,064 filed Nov. 10, 1997 and which is incorporated herein by reference.

BACKGROUND AND SUMMARY OF THE INVENTION

The present invention relates generally to electrically controlled pneumatic train brakes, computer controlled train brake systems and propulsion systems, and more specifically, to braking in and integration of the braking and the propulsion systems.

Computer controlled brake systems are well known as exemplified by CCBI and CCBII available from New York Air Brake Corporation. These systems provide computer controls of the pneumatic control unit for the pneumatic pipes running throughout the train. This allows pneumatic controls of the locomotive as well as the individual car brakes. More recently, the industry has been striving to provide electrically controlled pneumatic brakes on each of the cars. This is led to the electrically controlled pneumatic ECP system which is independent of the computer control braking system. An overview of such a system is EP-60 available from New York Air Brake Corporation.

As presently implemented, the ECP system in the locomotive runs in parallel to that of the conventional pneumatic locomotive train controls. Two brake valves are provided, one being the brake valve for the pneumatic braking and the other being the ECP brake valve. Similarly, separate displays are provided for each system. The locomotive or the consist of the locomotives do not respond to the brake commands made by the ECP system since the locomotives respond to pneumatic signals on pipes. Also, the ECP system has its own discreet input from the event recorder and from the locomotive controls to determine penalties.

The propulsion system on the locomotive is also a separate system from the ECP system and the convention of pneumatic locomotive and train controls. The propulsion system includes propulsion and dynamic braking as well as various auxiliary function related to braking, for example, sanding and power cut-off switch. Generally, the locomotives which are adjacent each other are a consist and include a lead locomotive. The lead locomotive provides electrical and pneumatic controls to the adjacent locomotives. There is also a distributed power system where the lead locomotive of one consist is separated from the lead locomotive of another consist by cars in the train. Historically, the two lead locomotives communicated via radio. The controls set by the lead locomotive are transmitted by radio to the remote lead locomotive. This provided duplication of the locomotive controls at both consists.

With the implementation of electrically controlled pneumatic brakes, there has been discussion of the desirability of integrating the computer controlled braking systems with the electrical controlled pneumatic brake systems.

The present system provides integrated operation of brake and propulsion systems for a train which includes a train brake pipe extending through locomotives and cars in the train, electropneumatic brakes on the locomotives and the cars connected to the train brake pipe and an electrical network. A brake controller on the locomotives provides brake commands, a propulsion system on the locomotives is connected to the network, and a propulsion controller on the locomotives provides propulsion commands.

The method of operating the brake and propulsion systems includes determining if the brake command signal is a pneumatic or electrical system initiated brake command or an operator initiated brake command. A brake signal and a emergency propulsion signal are transmitted on the network for pneumatic and electrical system and operator initiated emergency brake commands. A brake signal is transmitted on the train brake pipe for operator and pneumatic system initiated brake commands.

Wherein the train includes a lead and remote propulsion controller, the lead propulsion controller transmits to the remote propulsion controller instructions for the remote controller's corresponding brake controller to transmit a brake signal on the train brake pipe for operator and pneumatic system initiated emergency brake commands.

When the remote propulsion controller transmits a brake request to the lead propulsion controller, the lead propulsion controller transmits a brake propulsion signal in response to the brake request. The remote propulsion controller and the propulsion systems respond only to propulsion signals. The remote propulsion controller transmits locally detected pneumatic and electrical system and operator initiated brake requests. The remote propulsion controller transmits the brake request until the local which created the brake request event terminates and the remote propulsion controller receives a brake signal.

The lead propulsion controller provides the brake request to its brake controller, and the lead brake controller transmits a brake signal and instructs the lead propulsion controller to transmit a brake propulsion signal. The lead brake controller instructs the lead propulsion controller to transmit to the remote propulsion controller instructions for the remote controller's corresponding brake controller to transmit a brake signal on the train brake pipe for operator and pneumatic system initiated brake commands.

Where the brake system includes a locomotive brake pipe extending through adjacent locomotives and the locomotive brakes are also connected to the locomotive brake pipe, a locomotive brake signal is transmitting on the locomotive brake pipe for train and locomotive brake commands.

Brake signals may be transmitted on the train brake pipe and propulsion signals transmitted using a radio when the train is operating in a pneumatic mode. Brake signals and propulsion signals may be transmitted on the network when the train is operating in an electrical mode.

The system includes a single brake controller providing locomotive and train brake commands. A first brake control is connected to the brake controller and transmits a car brake signal on the network for train brake commands. A second brake control is connected to the brake controller and transmits a locomotive brake signal on the locomotive brake pipe for train and locomotive brake commands.

The brake system may have a pneumatic mode and an electrical mode. The first brake control transmits car brake signals on the network in the electrical mode and the second brake control transmits car brake signals on the train brake pipe for the pneumatic mode. The second brake control transmits locomotive brake signals on the locomotive brake pipe in either mode.

The brake controller provides a system initiated brake command or an operator initiated brake command. The first brake control transmits a brake signal on the network for system and operator initiated brake commands. The second brake control transmits an emergency brake signal on the train and locomotive brake pipes for operator initiated and pneumatic system brake commands. The brake controller has a lead or trail mode and provides the brake command signals only in the lead mode.

Other objects, advantages and novel features of the present invention will become apparent from the following detailed description of the invention when considered in conjunction with the accompanying drawings.

BRIEF DESCRIPTION OF THE DRAWINGS

FIG. 3 is a block diagram of the integration of a computer controlled brake system and a first electropneumatic brake system for locomotive system integration application.

DETAILED DESCRIPTION OF THE PREFERRED EMBODIMENT

Although the present brake system will be described using EP-60 electropneumatic train brake system and CCBI/CCBII computer controlled locomotive brake system as an example of two systems which may be integrated, the present integrated system can be implemented using other similar pneumatic and electropneumatic systems for train and locomotive brake controls.

Figure 1:
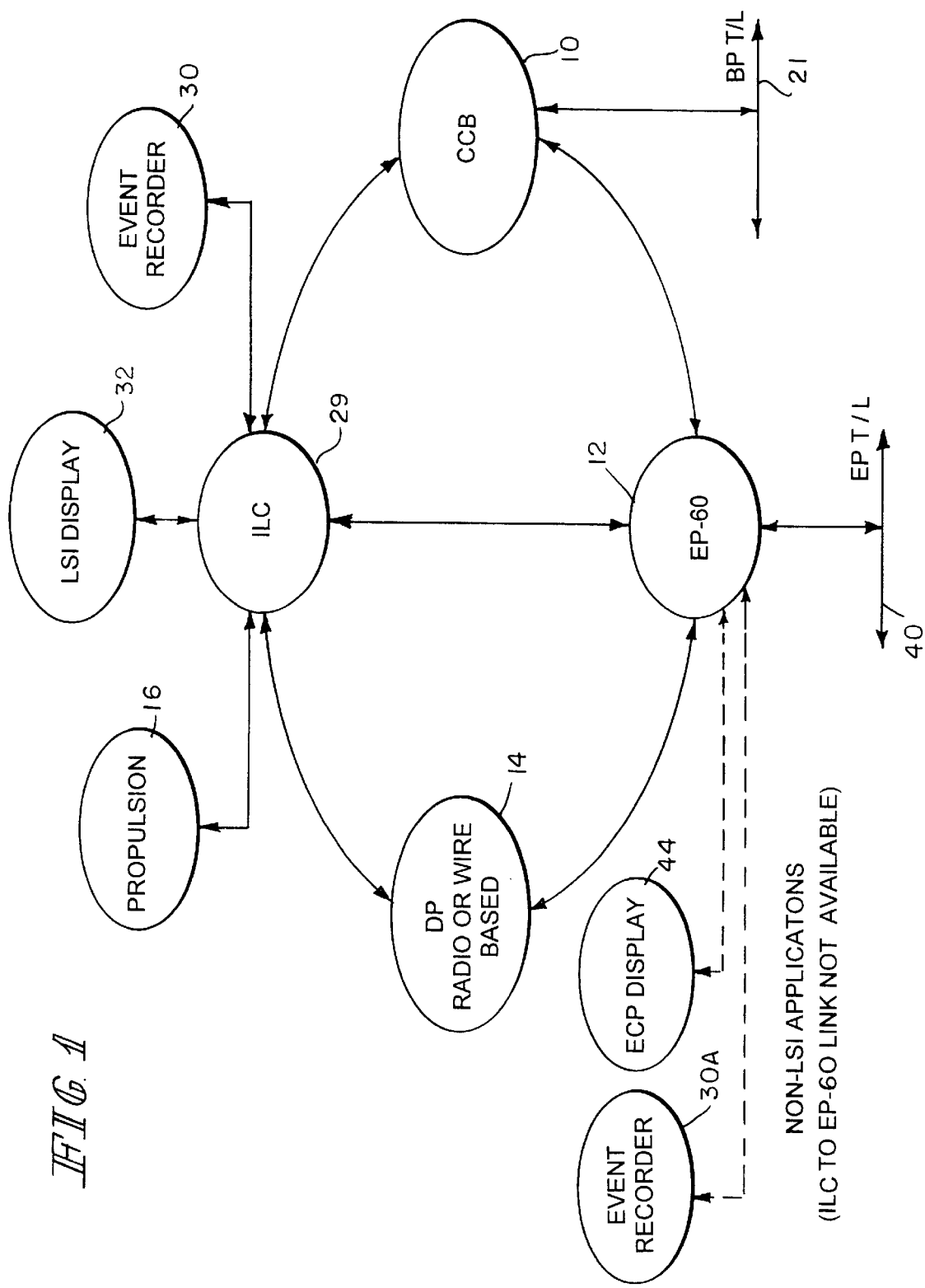
FIG. 1 is a diagram of the architecture of an integrated train electrical and pneumatic brake system for a locomotive system integration LSI and non-locomotive system integration applications.

An overview of the system architecture is illustrated in FIG. 1. A computer controlled locomotive brake system 10 is illustrated as a CCB. It controls the brake pipe train line 21. It is connected to an electropneumatic train brake system 12, which is illustrated as an EP-60 and controls a electropneumatic trainline 40. An integrated locomotive computer (ILC) 29 is connected to the CCB 10 and the EP-60 12. A distributor power system DP 14 is also provided and connected to the ILC 29. The ILC 29 is also connected to a propulsion system 16 and transmits information to the event recorder 30. An LSI display 32 is also connected to the ILC 29.

For non-locomotive system integration applications, namely where the ILC link to the EP-60 12 is not provided, an operator interface unit or ECP display 44 is provided and connected to the EP-60 and a separate event recorder 30A is connected to the EP-60. The event recorder 30 may be a separate and distinct device or integrated into the ILC 29. If it is a separate event recorder, it is the same event recorder as 30A.

Figure 2:
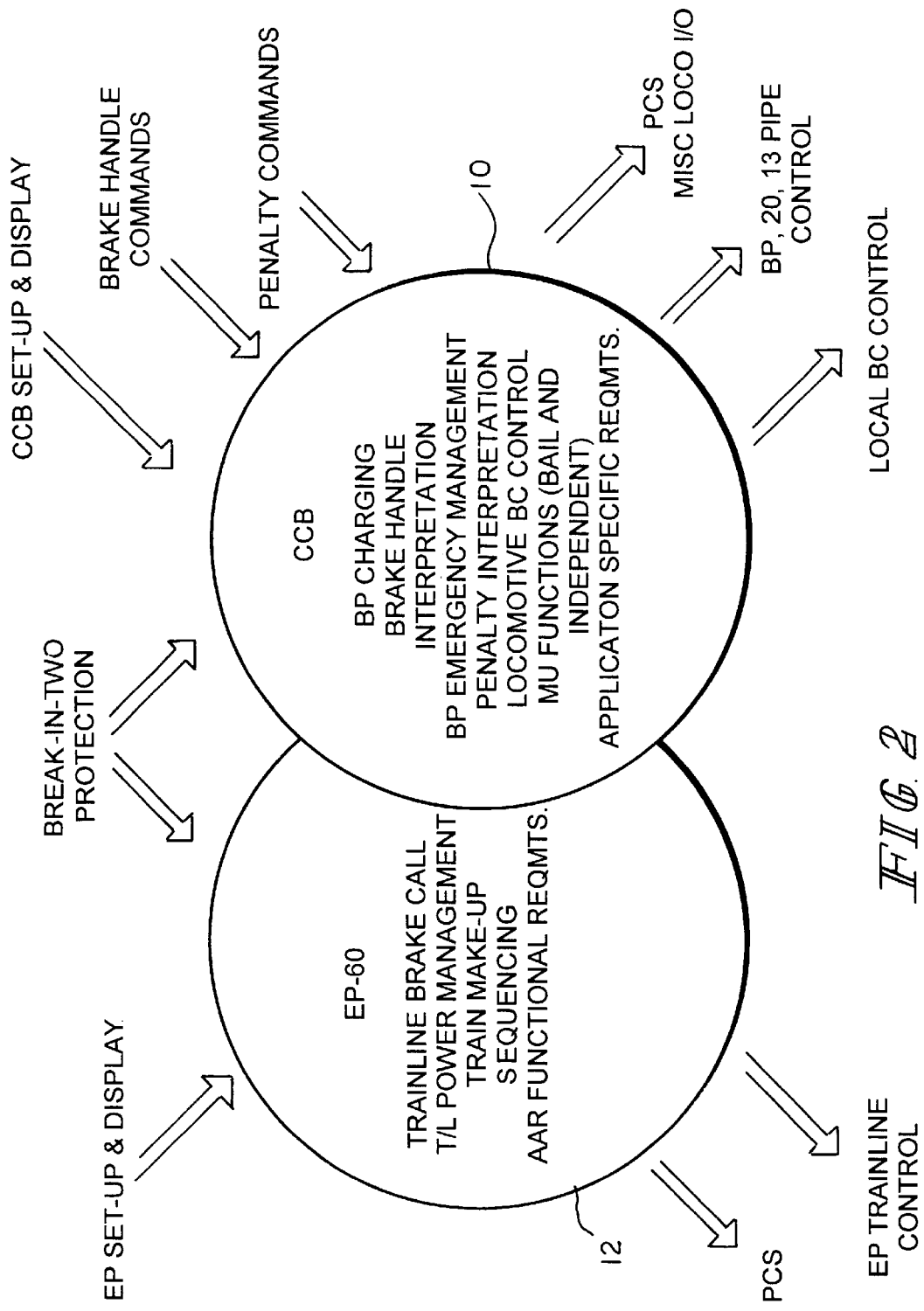
FIG. 2 is a diagram of system proportioning between the computer controlled brake system and an electropneumatic brake system.

The partitioning of the operation of the various operations performed by EP-60 and CCB is illustrated in FIG. 2. The EP-60 receives an EP set up and display information. It provides outputs to the power cut-off switch PCS of the locomotive system as well as the EP trainline control. The EP-60 is responsible for the EP trainline brake call, trainline power management, train makeup and sequencing and AAR functional requirements.

The CCB receives inputs from the CCB set up and display, brake handle commands and penalty commands. It provides outputs to the PCS and other miscellaneous locomotive input/outputs. It also controls the brake pipe, the 20 pipe and the 13 pipe as well as local brake cylinder controls. The CCB is responsible for brake pipe charging, brake handle interpretation, brake pipe emergency management, penalty interpretation, locomotive brake cylinder control, multi-unit operation function or MU functions (bail and independent), and application of locomotive specific requirements.

The interaction and the transfer of signals and control between EP-60 and the CCB will be explained with respect to a standard or pneumatic braking and electrical braking.

The computer controlled locomotive brake system 10 in FIG. 3 includes an electropneumatic control unit (EPCU) 20 responsive to input signals to control the pressure on brake pipe 21, independent application and release pipe (#20) 22 and the actuating pipe (#13) 23 and the brake cylinders 24 on its locomotive. The independent application and release pipe 22 and the actuating pipe 23 run throughout the locomotive consist and allow independent control of the locomotive brakes as distinguished from the control of the pneumatic brakes in each of the car by the brake pipe 21 running throughout the train. Electrical communication and control of the locomotives in the consist is available over the 27-pin mu wire 25. This is generally under the control of the propulsion control system (not shown).

A computer controlled brake system 10 is shown, for example as a CCBII, and includes an integrated processor module IPM 27 which electrically controls the pneumatic control unit 20. The IPM 27 receives inputs from an electronic brake valve EBV 26 having an automatic brake handle 26A to control the brake pipe 21 and an independent brake handle 26B to control the locomotive brakes via independent pipe 22 and actuating pipe 23. The EBV 26 is an operator brake control. An integrated locomotive computer ILC 29 connects the IPM to an event recorder 30 and displays 32. The event recorder 30 may be a separate element or integral to the ILC 29. Penalties, for example Aleter and Overspeed are inputs to the ILC 29. The propulsion system 16 communicates with the ILC 29. The ILC communicates with other locomotives in its consist via MU trainline 25.

The IPM 27 is connected to locomotive systems, not shown, and exchanges a power cut-off switch signal PCS, emergency sand signal ES and emergency magnetic valve EMV. The IPM 27 may be integrated with distributed power DP 14 and would communicate via radio module 33 to the other locomotives in the consist and well as distributed throughout the train. An end of train radio 31 communicates to the end of train device.

The connection between the IPM 27, the brake valve 26 and the electropneumatic control unit 20 is by a common bus. The suggested connection, which is an AAR standard, is a LonWork Network wherein each of the modules are a node on the neural network. The connection between the IPM 27 and the ILC 29 is a standard computer bus for example, an RS422-HDLC. The system is described so far is well known and need not be described in further detail.

The controls of an electrically controlled pneumatic brake system ECP of the prior art is illustrated as EP 60 available from New York Air Brake Corporation. The electric controlled pneumatic brakes includes a train power supply TPS 41, which connects the locomotive batteries to an EP train line 40. This is an electric line that runs throughout the train and provides electrical power and communications to EP brakes on each car and if available on locomotives. A trainline communication controller TCC 42 is connected to the EP trainline 40 as a node on the neural network. A car ID node is shown as node on the network and is part of the EP-60 system. In the prior art, the TCC 42 has no control over the pneumatic brake lines 21, 22 and 23. It only controls communication, either providing or receiving information, via the EP trainline 40. Thus, it can only communicate with other locomotives in the train which have TCC trainline controllers 42 or EP nodes on the network and connected to the EP trainline 40.

Although the EP trainline is shown as a line running through each car in the train, it is to be understood that the EP neural network may be by radio or other non-wire connection.

As implemented in the prior art, the EP brake system runs in parallel to that of the conventional pneumatic or computer control locomotive train controls. The two brake valves are provided, one the pneumatic brake valve and the other being the EP brake valve. Similarly, separate displays are provided. The locomotive or the consist of the locomotives do not respond to the brake commands made by the EP locomotive system. Also, the EP system has its own discreet input from the event recorder 30A and locomotive controls to determine penalties.

The integrating of the computer controlled braking systems (10) with the electrical controlled pneumatic brake system (12) is achieved by interconnecting these systems as nodes on a common network as shown. The integration results in having only a single brake control valve, namely the CCB control valve 26, and eliminating the EPC control valve. Also, separate access to the event recorder 30, end of train device and a display for the TCC 42 is not required and is available from the computer control brake portion 10 in or directly from the ILC. Access to the penalties and other locomotive controls for the TCC 42 is also through the computer control brake system 10 or directly from the ILC. Finally, the ability of the locomotive brakes to be under the electronic controlled pneumatic system TCC 42 is provided.

As shown in FIG. 3, the ILC 29 is directly connected by, for example, an RS 422 HDLC to the TCC 42 in locomotive system integration applications. This provides access to the event recorder 30 via the ILC 29. The TCC 42 may have its own operator interface 44.

The train control signals from the brake valve 26 is provided to the IPM 27 and, depending upon whether IPM 27 is in the pneumatic or the electrical mode, either controls the pneumatic control unit 20 for control of brake pipe 21, or provides the brake command signals to the TCC 42 which provides electrical train or car brake signals over the EP trainline 40. The IPM 27 will not reduce the equalization reservoir (not shown) in response to the brake valve automatic handle movements in the EP mode as it would in the pneumatic mode. This keeps the brake pipe 21 fully charged in the electrical mode.

All locomotives equipped with EP will respond to the control signal in the EP trainline 40 to apply its brakes in response to an EP application. Simultaneously, the lead and any remote lead ECP equipped locomotive will apply the proportional pneumatic brake signal on the independent brake application and release pipe 22. The signal on this pipe will be monitored by the trailing locomotive units that do not have EP capability and will apply the locomotive brakes accordingly.

A switch or set-up process will provide an indication to the IPM controller 27 whether it should be operating in the pneumatic or the electric control mode.

The IPM 27 in combination with the EBV 26 in FIG. 3 form a brake controller which provides locomotive and train brake commands. TCC 42 forms a first brake control connected to the brake controller 27,26 and transmits a car brake signal on the network or EP trainline 40 for train brake commands via TCC 42. A second brake control, which includes control unit 20, is also connected to the brake controller 27,26 and transmits a locomotive brake signal on the locomotive brake pipe, which is independent pipe 22, for train and locomotive brake commands. For distributive power, the integrated locomotive computer 29 in combination with the IPM 27 interfaces the propulsion system 16 and the locomotive systems with the brake system to transmit propulsion signals via TCC 42 to remote lead locomotives, propulsion controllers. The applying and release of the locomotive brakes using the independent pipe 22 can be achieved as well as bail-off without using the actuating pipe 23 or brake pipe 21. Thus, the actuating pipe 23 may be deleted.

As previously discussed, the brake controller 27,26 has a pneumatic mode and an electrical mode. The default mode for power up and certain types of failure is the pneumatic mode. In the electrical mode, the brake controller 27,26 provides trainline brake signals on trainline 40 for the cars and locomotives that have EP brakes and are connected to the trainline 40. In the pneumatic mode, the brake controller 27,26 provides the train or car brake signals on the brake pipe 21. For both the electronic and pneumatic mode, the control unit 20 provides locomotive braking signals on the locomotive brake pipe or independent brake pipe 22.

Figure 4H:
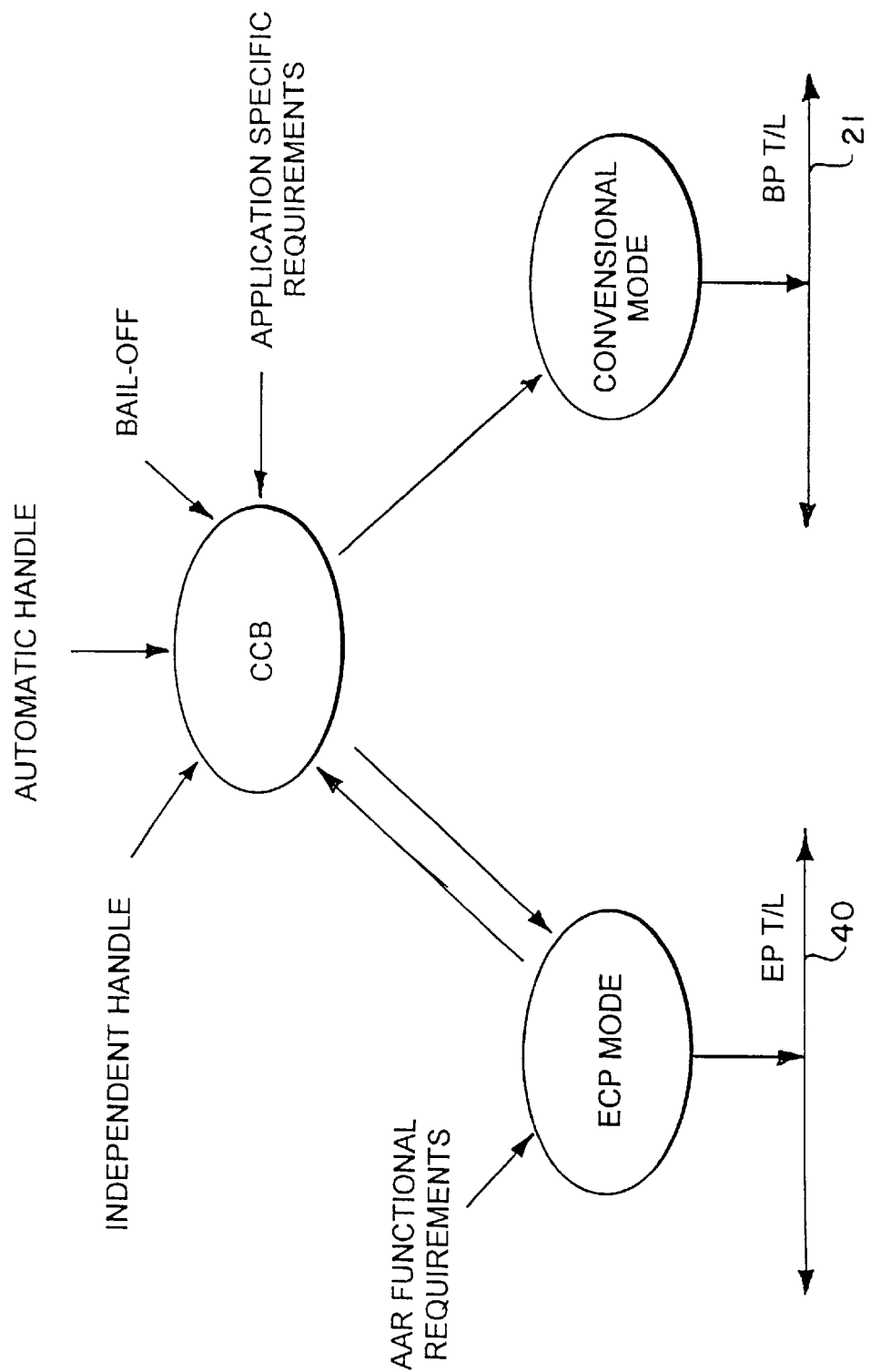
FIG. 4 is a block diagram illustrating brake valve control of the integrated system.

An overall view of the brake valve control is illustrated in FIG. 4. The EBV 26 provides an automatic handle, independent handle and bail-off inputs to the CCB which also executes application specific requirements for the locomotive. In a conventional or pneumatic mode, it controls the EP control unit 20 to control the brake pipe 21. In the electrical mode, there is communication between the TCC 42 and the CCB which controls the EP trainline 40.

In the electrical mode, the actuation of the automatic handle 26A is processed by the IPM 27 and provides train brake signals to TCC 42. TCC 42 then provides an electrical train braking signal on the EP trainline 40. It also provides back to IPM its electrical train signal, and the IPM 27 in turn provides braking commands to the EP control unit 20. The EP control unit 20 then provides an appropriate brake cylinder pressure for the brake cylinder 24 of that lead locomotive. The TCC's 42 on other remote lead locomotives provide the received train braking commands to their IPM's 27 which controls its EP control unit 20 to apply its brakes or brake cylinder 24.

The TCC 42 also, through IPM 27, commands the EP control unit 20 to apply a braking signal to the independent pipe 22. This allows pneumatic actuation of the trailing locomotives to the lead locomotive and the remote lead locomotive. This allows the consist to have non-EP equipped locomotives or the trail EP locomotives could have their electric mode cut-out or disabled. Thus, in the electrical mode, the electropneumatic control unit 20 is controlled by the TCC 42 and not by the EBV 26.

Since the independent pipe 22 is used to provide pneumatic signals to trail locomotives even in the electric mode, accommodations must also be made for the operation of the independent handle 26B in the electric mode. If the independent brake handle 26B is operated in the electric mode, the EBV 26 provides a signal to the TCC through IPM 27. The TCC 42 then provides a command back through IPM 27 to the EP control unit 20 to apply a pneumatic brake signal on the independent pipe 22. If the EP trainline 40 and the TCC 42 have the capabilities, they provide a locomotive braking signal to the EP equipped locomotives and not the cars also connect to the EP line 40. If the automatic handle 26A and the independent handle 26B are both braking at the same time, the more restrictive braking command is used to control the locomotive brakes.

Similarly, distributive power signals can be sent on the EP line 40 addressed to the remote lead locomotives in both the pneumatic and electrical modes. This would include distributive power commands, status and exceptions signals.

Figure 5:
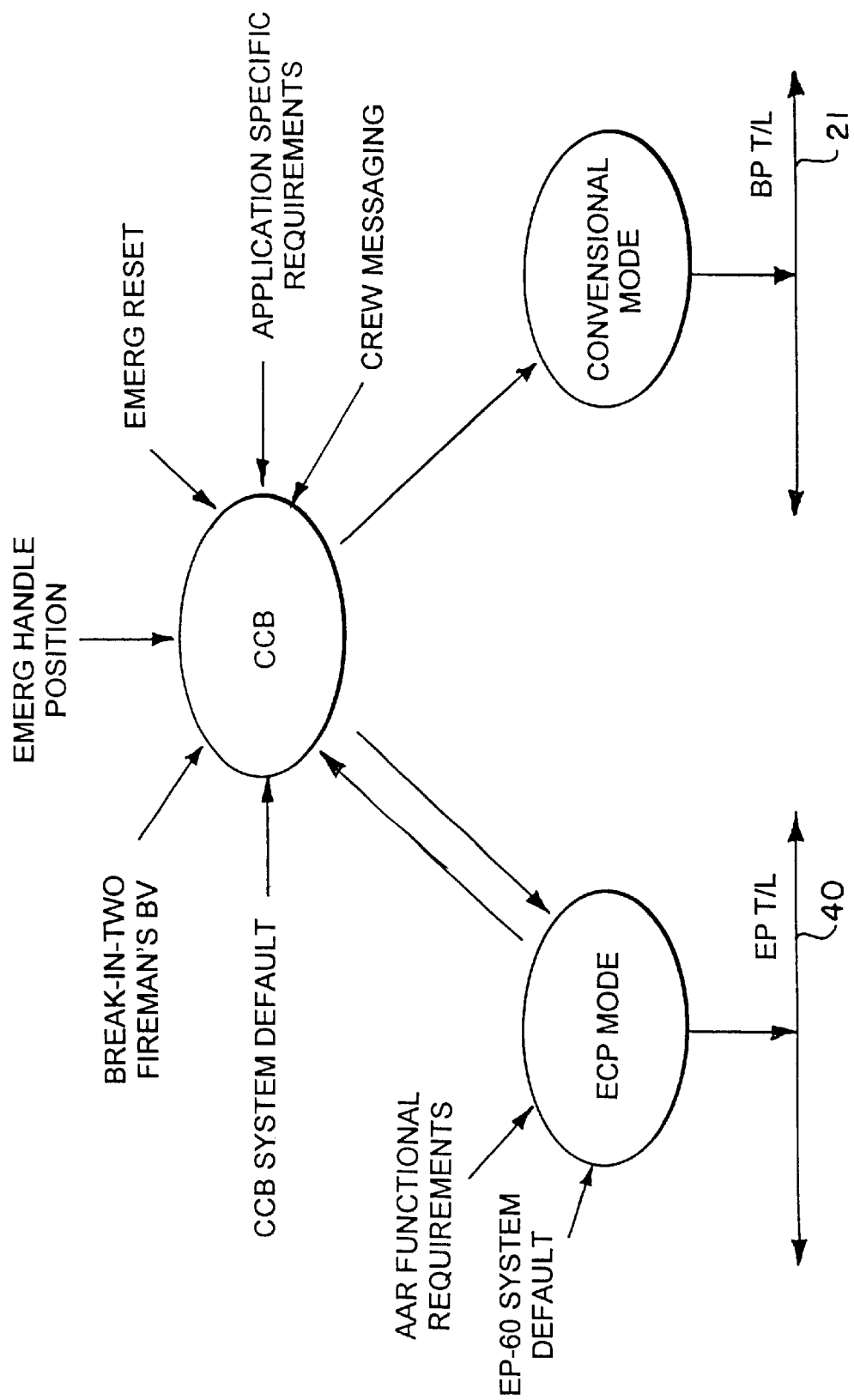
FIG. 5 is a block diagram of the electric mode emergency control of the integrated system.

The controller 27,26 can determine a system initiated emergency brake command or an operator initiated emergency brake command, as illustrated in FIG. 5. The operator initiated brake commands will come from the brake valve 26 as emergency handle positions. The system initiated brake commands include an electrical system emergency or a pneumatic system emergency. The electrical system emergencies include EP-60 system default, CCB system default and crew messaging. The pneumatic system emergencies include break-in-two and Fireman's Brake Valve.

For emergencies, the controller 27,26 provides signals to the TCC 42 which transmits an emergency brake signal on the network for system and operator initiated emergency brake commands. The controller 27,26 provides commands to the control unit 20 which transmits an emergency brake signal on the train and locomotive brake pipes 21,22 for operator initiated and pneumatic system initiated emergency brake commands. Thus, for electrical system emergency brake commands, only the EP brake is applied, while for operator and pneumatic system emergency brake commands, the EP and the pneumatic brake systems are operated. The train brake signals and the locomotive brake signals are transmitted on the trainline 40 as a percentage of brake signals.

An emergency magnetic valve EMV, under the control of TCC 42 may be provided in parallel to the EP control unit 20. If the distributive power system DP includes the emergency magnetic valve, the TCC 42 may jointly control the magnetic valve.

The TCC 42 will control electrical resetting and IPM 27 will control pneumatic resetting after an operator initiated or pneumatic system initiated emergency. The TCC 42 will control electrical resetting after an electrical system initiated emergency and after the automatic handle 26A has been in full service or suppression for a fixed time before release position can be selected.

Figure 6:
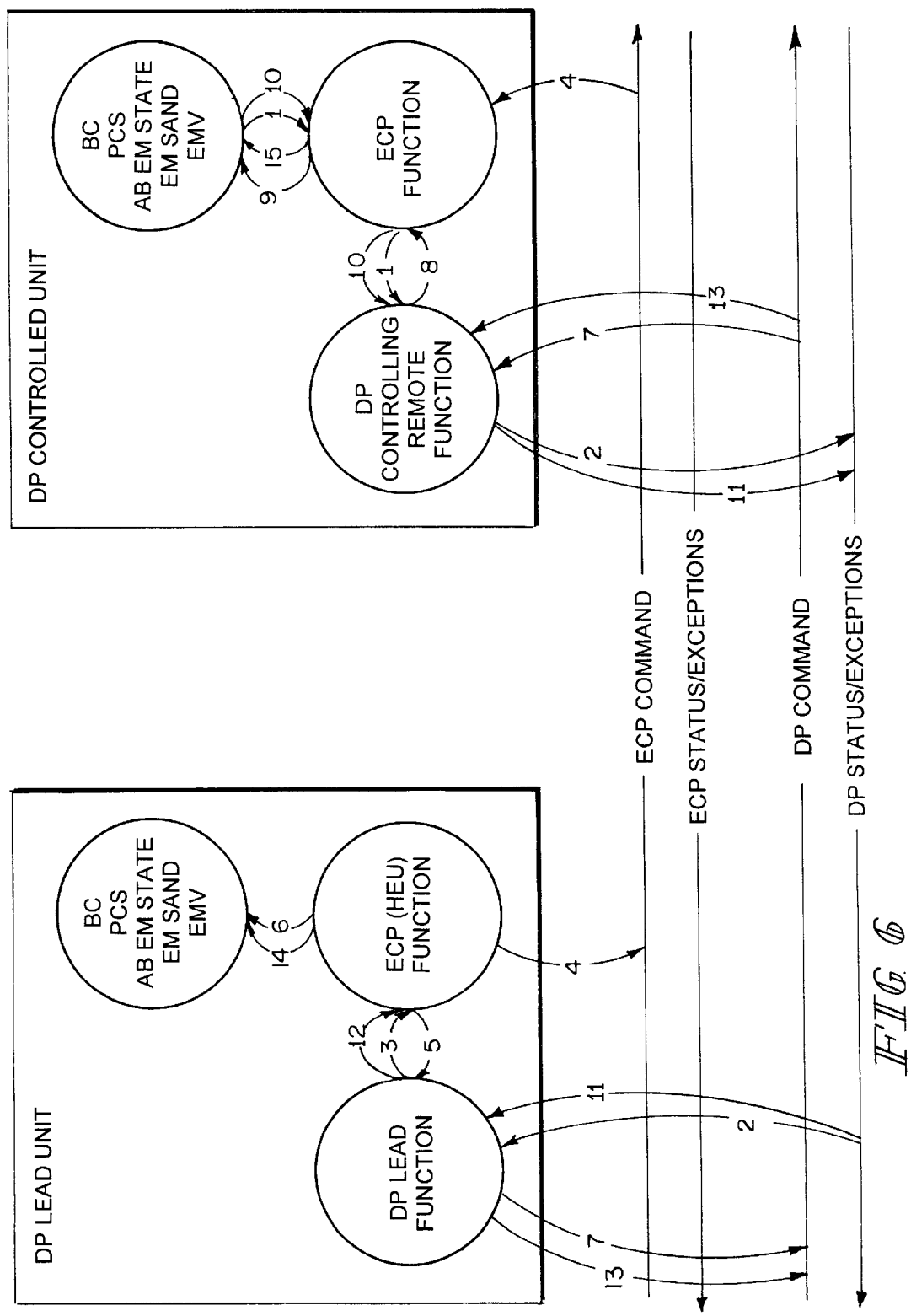
FIG. 6 is a block diagram of the emergency control of the integrated brake and propulsion system.

The integration use of the distributive power system to sense and control emergency braking will be described with respect to FIG. 6. It should also be noted that the penalty conditions to be discussed with respect to FIG. 7, can also be performed using the distributive power system. Both may produce brake request at a remote lead unit. FIG. 6 is a diagram of the functional component and the interaction of a DP lead unit and a DP controlled or remote unit. Each includes a DP function section, an ECP function section and the various locomotive controls. These locomotive controls include a locomotive brake cylinder control BC, a power cut-off switch control PCS, air brake emergency state AB EM state, emergency sanding EM SAND and emergency magnetic valve EMV. The two units are interconnected by the EP trainline 40. The signals over the EP brake line 40 are illustrated as ECP command, ECP status/exceptions for the EP system and DP command and DP status/exceptions for the distributive power system.

The emergency brake control in the DP mode operate in conjunction with the existing ECP and computer brake emergency brake control logic to execute trainline emergency brake commands. If not in the DP mode, the DP controlled unit will act as any other car on the train. All emergency brake applications will be controlled and managed from the lead unit. The DP system is capable of handling both electronic trainline emergencies (ECP only) and conventional pneumatic emergencies (brake pipe). DP lead unit and the DP controlled unit have local capability to detect emergency conditions and then relay an emergency request to the ECP lead (HEU). The DP lead unit shall detect the remote emergency condition based on receipt of the DP control unit status information and/or exception messages. The DP system is capable of directing the ECP system to initiate emergency brake commands from the lead unit. The lead unit has a capability to request a conventional brake pipe emergency rate or reduction upon a detection of a pneumatic emergency condition on the DP controlled unit.

As previously noted, the status information and/or exception reporting may also include penalty status. Both the emergency and penalty conditions or status will be considered brake requests.

It should be noted that when the system is in the conventional non-DP mode, the conventional brake system on the DP controlled unit detects pneumatic emergencies, for example, brake-in-twos, remote automatic handle to emergency position, ETC, and as a result, enters a conventional pneumatic emergency state. Upon entering a conventional emergency state, the electropneumatic control unit 20 initiates the emergency condition for a given amount of time. Electric sanding is also set for a given amount of time as well as setting the power cut-off switch. While emergency sanding remains active for the duration of a sanding timer, the power control PCS remains active as long as the conventional emergency state remains active. The emergency state remains active until the emergency timer has expired and the air brake system automatic brake handle has been replaced into the emergency position for reset.

To explain the integration of the distributive power system with the ECP system, and since the detection of an emergency event in the DP controlled unit is more complicated, it will be explained first. Although the integrational architecture of FIG. 6 is by way of example, others may be used.

FIG. 6 describes the information transfer requirements for handling a pneumatic emergency event at a DP controlled unit. When a local conventional emergency state becomes active at a DP controlled unit, it issues an emergency brake request to the DP lead unit. The emergency state or emergency brake request remains active until the DP controlled unit receives an appropriate DP emergency brake response from the DP lead unit.

Referring to FIG. 6, the sequences are indicated by arrows with numbers.

The sequence begins at arrows 1 wherein the conventional air brake emergency brake state is entered at the DP control unit. This is sensed by the electropneumatic control unit 20. It cuts off brake pipe charging and through the IPM 27 sets the PCS, initiates the emergency timer and initiates the emergency sanding timer locally. The status is also routed through the ECP function to the DP controlling remote function. The ECP function can also provide an ECP trainline emergency which results from an electrical emergency state.

In the second step of the process, arrow 2, the DP controlled unit status is transmitted to the DP lead unit. This is an emergency request and may be an ECP trainline emergency request or pneumatic trainline emergency request over the trainline 40. This will be in the form of a DP status message and/or a DP exception message.

In next step, arrow 3, the DP lead unit via the DP lead function requests an ECP emergency brake application from the EPC (HEU) function to produce a train wide emergency brake application, arrow 4. The ECP train brake command on the EP line 40 is received by each EPC equipped cars and the locomotives of the train. As a result, the ECP functions on the DP lead unit and the DP controlled unit commands an equivalent brake cylinder pressure locally. The ECP's (HEU) function also transmits the EPC emergency brake command back to the DP lead function illustrated by arrow 5 and sets the lead PCS and enters the EPC emergency state as indicated by arrow 6.

Upon receiving a pneumatic trainline emergency request via arrow 2 from the DP controlling remote function and receiving an ECP emergency command via arrow 5 from the ECP (HEU) function, the DP lead function will transmit a DP train wide emergency command on the EP trainline 40 indicated by arrow 7. The DP command are received by the DP controlling remote function and is routed through the ECP function to the conventional air brake system via arrow 8 to place it in an electropneumatic emergency state and via arrow 9 to the PCS controller and the EMV controller.

These DP commands include ECP emergency, pneumatic emergency and PCS.

When the DP controlled unit receives the ECP and DP emergency commands from the DP lead function, and the local emergency event terminates, this may be removal of the emergency function or the aspiration of the emergency timer, the conventional emergency state is allowed to clear. With this, the local PCS command is cleared and the ECP and pneumatic emergency request to the lead unit is removed. At this point, the DP controlled unit follows the ECP lead commands only and the DP lead commands are also routed locally to the ECP (HEU) and the local air brake system to the emergency state controller, the PCS controller and the EBV controller. Thus, the event that had been detected at the remote is replicated at the lead.

The clearing of the local conventional air brake emergency state is routed back through the ECP function to the DP controlling remote function as illustrated by arrows 10. The DP controlling remote function then clears a previously set ECP and pneumatic trainline emergency request status on the EP trainline 40 to the DP lead signified by arrows 11. The DP lead function removes the emergency request to the ECP function (HEU) as indicated by arrow 12 and waits for the ECP function (HEU) to remove the train wide emergency.

The DP lead unit provides trainline commands to the DP controlled unit as indicated by arrow 13 to indicate that there is no pneumatic emergency, there is no ECP emergency enforcement and there is not a trainline PCS. The ECP (HEU) function returns the control to the operator or handle. The DP controlled unit in response to the trainline commands, deactivates DMV removes the PCS, re-establishes brake pipe charging via the EPC function as indicated by arrow 14. The same function is performed at the DP lead unit as illustrated by arrow 15.

The electromagnetic valve EMV is activated only in the pneumatic or operator initiated emergencies. The operator initiated emergencies in this context is moving the auxiliary handle to the emergency position to produce a pneumatic emergency.

When the emergency event is local to the DP lead unit, the ECP (HEU) function will transmit the train brake command on the EP line 40 signified by arrow 4 and transmits an ECP emergency command back to the DP lead function signified by arrow 5. The operation then continues as for a remotely located emergency event to effectuate emergency conditions at the DP lead unit and all DP controlled units. The clearing of the emergency event condition, including expiration of the timers, occurs at the DP lead unit which is routed through ECP function locally as well as remotely through the DP lead function as indicated by arrow 13.

Figure 7:
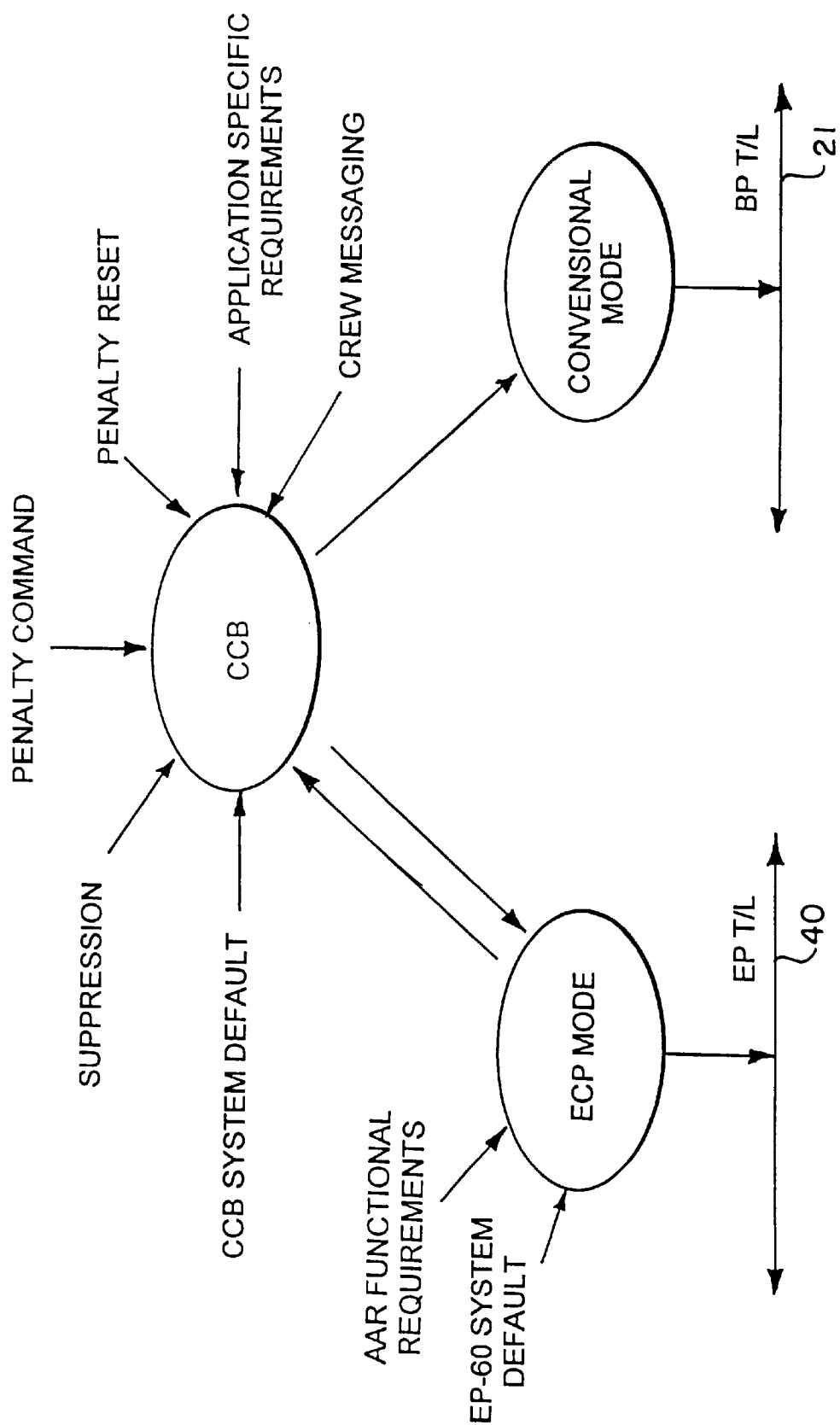
FIG. 7 is a block diagram of the penalty control of the integrated system.

The controller 27,26 provides penalty brake commands, as illustrated in FIG. 7. For these penalty brake commands in the electrical control mode, it provides penalty brake command signals to the control TCC 42 to transmit a car brake signal on the network for penalty brake commands. Penalty braking is generally a full service. As with other car brake signals on the network, the brake pipe 21 is maintained charged. A penalty acknowledgment is needed from the TCC 42 to IPM 27. If it is not received, the IPM 27 will command a pneumatic emergency application using the EP control unit 20.

Controller 27 also determines whether suppression brake command has occurred to either remove or prevent the application of a penalty brake. This is the suppress position of the automatic brake handle of the electric brake valve 26. If the suppression brake commands occur during a penalty brake command, the controller 27,26 does not send control or brake command signals to the control 42 or removes and interrupts any penalty application which control 42 provides on the EP trainline 40. As is well known, the controller 27,26 provides a power cutoff signal to the locomotive propulsion system for penalty brake commands.

In prior systems, moving the automatic brake handle to the suppression position causes a brake pipe reduction which applies the train brakes. This is undesirable and avoided by the present system, which uses the suppression position only as an electric control signal and does not produce pneumatic results in the brake pipe 21.

As can be seen, in an ECP train, the brake pipe is primarily an air supply and is not used for brake controls. In the present system, the brake pipe 21 is used as a back up to allow pneumatic operation of the train brakes as well as for operator and pneumatic system initiated emergencies. With future acceptance by the industry of ECP brakes, the train brake pipe 21 and the locomotive pipes 22 and 23 may have no control functions. In an all EP train, the independent locomotive brake pipe 22 and the actuating locomotive pipe 23 will be eliminated. All signals will be sent out over the EP trainline 40. Thus, trainline braking signals will be addressed separately to cars and locomotives, and special locomotive braking signals will be addressed only to locomotives.

It should also be noted in the present system, even those which include the independent brake pipe 22 with or without the actuating pipe 23, that those locomotives which have EP brakes preferably will receive their brake signal over the electric trainline 40. Those locomotives that do not have EP brakes will receive the signals pneumatically over the independent or locomotive brake pipe 22. Those locomotives which are not adjacent to the lead locomotive and not connected to other locomotives by the independent brake pipe 22 will either receive their signals by radio 33 or the remote locomotive may have EP capability and receive its signals on EP trainline 40. It may then control other adjacent locomotives on its consist pneumatically if they are connected by an independent pipe 22.

Another example of a remote locomotive would be a helper locomotive which is attached at the end of the train when needed to ascend a certain grade. These locomotives would be EP equipped and would take their locomotive brake signals off the EP trainline 40. These would include automatic, independent and bail-off commands.

The brake controller 27 will power up in a conventional or pneumatic mode. In order to be switched over to the electrical mode, it must be selected as a lead locomotive and then switched over to the electric mode.

By integrating or coordinating the electrically controlled pneumatics or the ECP system through the computer control brake system, allows enhancement of safety. The computer controlled brake system can determine whether the electrical controlled pneumatics 42 are operating and if not, provide pneumatic control of the brake pipe 21 to ensure braking throughout the train. Also, by providing a single brake control valve 26 and a single display 32, the operator need not make a decision in an emergency on whether to switch from electrical controls to pneumatic controls. The operator uses a single handle and a single display and selects whether to use pneumatic or electrical controls. If the electrical controlled brakes are not operative, the system will automatically switch to pneumatic control without any other input from the operator. Thus, not only does the integration increase reliability of the two systems, but also substantially removes operator error.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A method of operating a brake and a propulsion system of a train which includes a train brake pipe extending through locomotives and cars in the train, electropneumatic brakes on the locomotives and cars connected to the train brake pipe and an electrical network, a brake controller on the locomotives providing brake commands, a propulsion system on the locomotives connected to the network, and a propulsion controller on the locomotives providing propulsion commands, the method comprising:
   determining if the brake command signal is a pneumatic or an electrical system initiated brake command or an operator initiated brake command;
   transmitting a brake signal and a propulsion signal on the network for pneumatic and electrical system and operator initiated brake commands; and
   transmitting a brake signal on the train brake pipe for operator and pneumatic system initiated brake commands.

2. The method according to claim 1, wherein the train includes a lead and a remote propulsion controller; and the lead propulsion controller transmits to the remote propulsion controller instructions for the remote controller's corresponding brake controller to transmit a brake signal on the train brake pipe for operator and pneumatic system initiated brake commands.

3. The method according to claim 1, wherein the train includes a lead and a remote propulsion controller; and the remote propulsion controller transmits a brake request to the lead propulsion controller, and the lead propulsion controller transmits a brake propulsion signal in response to the brake request.

4. The method according to claim 3, wherein the remote propulsion controller and the propulsion systems respond only to propulsion signals.

5. The method according to claim 3, wherein the remote propulsion controller transmits locally detected pneumatic and electrical system and operator initiated brake requests.

6. The method according to claim 5, wherein the remote propulsion controller transmits emergency and penalty brake requests.

7. The method according to claim 3, wherein the remote propulsion controller transmits the brake request until the local event which created the brake request terminates and the remote propulsion controller receives a corresponding brake signal.

8. The method according to claim 3, wherein the lead propulsion controller provides the brake request to its brake controller, and the lead brake controller transmits a brake signal and instructs the lead propulsion controller to transmit a brake propulsion signal.

9. The method according to claim 8, wherein the lead brake controller instructs the lead propulsion controller to transmit to the remote propulsion controller instructions for the remote propulsion controller's corresponding brake controller to transmit a brake signal on the train brake pipe for operator and pneumatic system initiated brake commands.

10. The method according to claim 1, wherein emergency propulsion brake signals include emergency enforcement, idle and power cutoff switch commands.

11. The method according to claim 1, wherein the brake system includes a locomotive brake pipe extending through adjacent locomotives and the locomotive brakes are also connected to the locomotive brake pipe; and including:
   determining if the brake command signal is a train brake command or a locomotive brake command;
   transmitting a car brake signal on the network for train brake commands; and
   transmitting a locomotive brake signal on the locomotive brake pipe for train and locomotive brake commands.

12. The method according to claim 1, determining if the brake controller is in a lead or trail mode and determining type of brake command signals only for determined lead mode.

13. The method according to claim 1, including transmitting brake signals on the train brake pipe and propulsion signals using a radio when the train is operating in a pneumatic mode; and including transmitting brake signals and propulsion signals on the network when the train is operating in an electrical mode.

14. A brake system of a train described in and for performing the method of claim 1,
   wherein the brake controller determines if the brake command signal is a pneumatic and electrical system initiated brake command or an operator initiated brake command; and
   the system further comprising:
   a first brake control which is connected to the controller and transmits a brake signal on the network for pneumatic and electrical system and operator initiated brake commands, and
   a second brake control which is connected to the controller and transmits an emergency brake signal on the train brake pipe for pneumatic system and operator initiated brake commands.

15. The system according to claim 14, including a locomotive brake pipe extending through adjacent locomotives and the locomotive brakes are connected to the locomotive brake pipe;

the brake controller provides locomotive and train brake commands;

the first brake control transmits a car brake signal on the network for train brake commands; and the second brake transmits a locomotive brake signal on the locomotive brake pipe for train and locomotive brake commands.

16. The system according to claim 14, wherein the brake controller has a lead or trail mode and provides brake command signals only in the lead mode.

17. The system according to claim 14, including an electropneumatic valve connected to the train brake pipe and controlled by the second brake control to produce the brake signal on the train brake pipe.

18. The system according to claim 14, wherein the brake controller includes an operator control providing operator brake commands;

in the electrical mode, the brake controller provides the operator brake commands to the first brake control, the first brake control transmits locomotive and car brake signals on the network and the locomotive brake signal back to the brake controller, the brake controller provides the locomotive brake signal to the second brake control, and the second brake control applies the brake of the locomotive; and in the pneumatic mode, the brake controller provides the operator brake commands to the second brake control, and the second brake control transmits the car brake signal on the train brake pipe and applies the brake of the locomotive.

19. The system according to claim 15, wherein the brake controller includes an operator control providing operator brake commands;

in the electrical mode, the brake controller provides the operator brake commands to the first brake control, the first brake control transmits locomotive and car brake signals on the network and the locomotive brake signal back to the brake controller, the brake controller provides the locomotive brake signal to the second brake control, and the second brake control transmits the locomotive brake signal on the locomotive brake pipe and applies the brake of the locomotive; and in the pneumatic mode, the brake controller provides the operator brake commands to the second brake control, and the second brake control transmits the car brake signal on the train brake pipe, transmits the locomotive brake signal on the locomotive brake pipe, and applies the brake of the locomotive.

20. The system according to claim 14, wherein the first brake control resets the network for pneumatic and electrical system and operator initiated brake commands; and the brake controller resets the second brake control for pneumatic system and operator initiated brake commands.

21. An integrated propulsion and brake train control system comprising:

a wire trainline and brake pipe extending through locomotives and cars on the train;

an electropneumatic brake controller in the locomotives and controlling the brake pipe and providing electropneumatic brake signals on the trainline;

a propulsion controller in the locomotives and providing propulsion signals on the trainline;

an operator interface connected to the brake controller and the propulsion controller;

an electropneumatic brake system in the cars and locomotives and connected to the trainline and brake pipe;

a propulsion system on locomotives and connected to the propulsion controller; and the operation of the brake controller and the propulsion controller are integrated to provided coordinated brake and propulsion signals on the trainline and brake pipe.

22. The system according to claim 21, wherein the train includes a lead and a remote propulsion controller; and the lead propulsion controller transmits to the remote propulsion controller instructions for the remote controller's corresponding brake controller to transmit a brake signal on the train brake pipe for pneumatic system brake commands.

23. The system according to claim 21, wherein the train includes a lead and a remote propulsion controller; and the remote propulsion controller transmits a brake request to the lead propulsion controller, and the lead propulsion controller transmits a propulsion signal in response to the brake request.

24. The system according to claim 23, wherein the remote propulsion controller and the propulsion systems respond only to propulsion signals.

25. The system according to claim 23, wherein the remote propulsion controller transmits locally detected pneumatic and electrical system and operator initiated brake requests.

26. The system according to claim 25, wherein the remote propulsion controller transmits emergency and penalty brake requests.

27. The system according to claim 23, wherein the remote propulsion controller transmits the brake request until the local event which created the brake request terminates and the remote propulsion controller receives a corresponding brake signal.

28. The system according to claim 23, wherein the lead propulsion controller provides the brake request to its brake controller, and the lead brake controller transmits a brake signal and instructs the lead propulsion controller to transmit a brake propulsion signal.

29. The system according to claim 28, wherein the lead brake controller instructs the lead propulsion controller to transmit to the remote propulsion controller instructions for the remote propulsion controller's corresponding brake controller to transmit a brake signal on the train brake pipe for operator and pneumatic system initiated brake commands.

30. The system according to claim 21, wherein emergency propulsion brake signals include emergency enforcement, idle and power cutoff switch commands.

* * * * *